(12) United States Patent
Ozsoylu (10) Patent No.: US 7,477,026 B2
(45) Date of Patent: Jan. 13, 2009

(54) POWER STEERING ASSEMBLY

(75) Inventor: Suat A. Ozsoylu, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 150 days.

(21) Appl. No.: 11/713,141

(22) Filed: Mar. 2, 2007

(65) Prior Publication Data

US 2008/0210487 A1     Sep. 4, 2008

(51) Int. Cl.
  *H02P 1/00* (2006.01)
(52) U.S. Cl. .............. 318/119; 318/116; 318/129; 318/135; 310/258; 180/444; 180/446
(58) Field of Classification Search ............. 318/116, 318/119, 129, 135; 310/258; 180/444, 446
See application file for complete search history.

(56) References Cited

U.S. PATENT DOCUMENTS

| | | | |
|---|---|---|---|
| 3,684,904 | A | 8/1972 | Galutva et al. |
| 4,736,131 | A | 4/1988 | Fujimoto |
| 5,319,257 | A | 6/1994 | McIntyre |
| 5,332,942 | A | 7/1994 | Rennex |
| 5,725,023 | A | 3/1998 | Padula |
| 5,780,957 | A | 7/1998 | Oliver et al. |
| 5,887,828 | A | 3/1999 | Appa |
| 5,907,269 | A | 5/1999 | Zrostlik |
| 5,924,518 | A * | 7/1999 | D'Onofrio ............ 180/444 |
| 6,144,137 | A * | 11/2000 | Engelbert ............ 310/258 |
| 6,150,750 | A | 11/2000 | Burov et al. |
| 6,246,157 | B1 | 6/2001 | Oliver et al. |
| 6,247,796 | B1 | 6/2001 | Silverbrook |
| 6,360,841 | B1 | 3/2002 | Blandino et al. |
| 6,373,170 | B1 | 4/2002 | Hills |
| 6,380,661 | B1 | 4/2002 | Henderson et al. |
| 6,481,667 | B1 | 11/2002 | Ho |
| 6,543,570 | B2 * | 4/2003 | Parker ............ 180/446 |
| 6,666,513 | B2 * | 12/2003 | Zheng et al. ............ 297/344.1 |
| 6,799,654 | B2 | 10/2004 | Menjak et al. |
| 6,804,592 | B2 | 10/2004 | Klein et al. |

(Continued)

OTHER PUBLICATIONS

Stewart Sherrit, "Smart material/actuator needs in extreme environments in space," SPIE Smart Structures Conference, Mar. 6-10, 2005, SPIE vol. 5761, San Diego, CA, USA.

(Continued)

*Primary Examiner*—Paul Ip
(74) *Attorney, Agent, or Firm*—Thomas W. Twomey (57) ABSTRACT

The invention provides for a power steering assembly and method of actuation for assisting a driver in moving the steerable wheels of a vehicle. The power steering assembly includes a housing that defines a chamber. A steering rod is disposed in the chamber and is longitudinally moveable within the chamber. A shoulder is fixed to the steering rod and has opposing sides. A shaft is supported by the housing and engages the steering rod translating the rotational movement of the shaft into a longitudinal movement of the steering rod. A first actuator and second actuator are disposed in the chamber on opposing sides of the shoulder. The first and second actuators each have an excitable material that is controlled in a series of actuations to advance the actuators in a linear movement for pushing against the shoulder to move the steering rod longitudinally within the chamber.

20 Claims, 5 Drawing Sheets

U.S. PATENT DOCUMENTS

| | | | |
|---|---|---|---|
| 6,924,586 | B2 | 8/2005 | Moler |
| 6,926,114 | B2 | 8/2005 | Bolourchi et al. |
| 6,991,573 | B2 * | 1/2006 | Yun ........................ 475/149 |
| 7,045,932 | B2 | 5/2006 | Xu et al. |
| 7,178,625 | B2 * | 2/2007 | Yun ........................ 180/444 |
| 2002/0180310 | A1 | 12/2002 | Ngol et al. |
| 2003/0006088 | A1 * | 1/2003 | Parker ..................... 180/446 |
| 2007/0278031 | A1 * | 12/2007 | Andersson ................ 180/444 |
| 2008/0156406 | A1 * | 7/2008 | Breed ...................... 152/415 |

OTHER PUBLICATIONS

K.-D. Muller, H. Marth, P. Pertsch, R. Gloss, X. Zhao, "Piezo-Based, Long-Travel Actuator For Special Environmental Conditions," 2006 by Physik Instrumente (PI) GmbH & Co. KG; reprinted from Physik Instruments & http://www.pi.us & http://www.physikinstrumente.com Christopher Niezrecki, Sivakumar Balakrishnan, Diann Brei, Andrew Moskalik, "Piezoelectric Actuation: State of the Art" reprinted from The Shock and Vibration Digest, vol. 33, No. 4, Jul. 2001 pp. 269-280, Sage Publications, USA.

"Delphi Electric Power Steering," Delphi Corporation, 2005, reprinted from http://ppd.delphi.com/pdf/ppd/chsteer/str_eps.pdf, Troy, MI, USA.

"Adaptive Wing Improves Fuel Efficiency and Payload," Etrema Products, Inc., 2002, Ames, IA, USA.

* cited by examiner

POWER STEERING ASSEMBLY

BACKGROUND OF THE INVENTION

1. Field of the Invention

A power steering assembly for a vehicle to assist in steering a vehicle.

2. Description of the Prior Art

Typically, a power steering system involves a hydraulic system. The hydraulic system requires several components, which mainly include a power steering pump for pressurizing fluid and a control valve. A steering wheel is connected to the control valve such that rotation of the steering wheel rotates the control valve. The control valve directs the pressurized fluid from the pump into a side of a piston to assist the driver in turning steerable wheels of a vehicle. These hydraulic systems require heavy components and are an additional inefficiency to the engine due to the power demands of the power steering pump. However, the hydraulic system is well known in the art and advanced systems with variable power assistance and advance controllers are widely used in vehicles today.

Another power steering system, such as the one disclosed in U.S. Pat. No. 6,991,573, utilizes an electric motor to provide assistance to turn the steerable wheels of the vehicle. The electric motor rotates a motor shaft at high speed and is geared down through a gear train that converts the rotational motion of the motor shaft into a linear advance that aids the driver to move the steerable wheels. The conversion of the rotary motion of the electric motor into a linear movement creates backlash and adds additional inertia and frictional inefficiency to the power steering system. In particular, to change direction of the linear movement requires the electric motor, which can be rotating in one direction, to stop and rotate in an opposite direction. The inertia of the electric motor, as well as the remaining components of the power steering system, can be substantial and can introduce a variety of inefficiencies into the system.

Therefore, it is desirable to design a power steering system that does not require a conversional gear train from a rotary movement into a linear movement, compatible with power restraints of electric or hybrid vehicles and does not require additional components such as a power steering pump or an electric motor to assist the driver in moving the steerable wheels.

SUMMARY OF THE INVENTION AND ADVANTAGES

The invention provides for a power steering assembly and method of actuation for assisting a driver in moving the steerable wheels of a vehicle. The power steering assembly includes a housing. The housing includes an inner surface that defines a chamber and the chamber extends along an axis. A steering rod is disposed in the chamber and is longitudinally moveable within the chamber. A shoulder fixed to the steering rod and has opposing sides. A shaft is supported by the housing and engages with the steering rod translating the rotational movement of the shaft into a longitudinal movement of the steering rod. A first actuator disposed in the chamber on one of the sides of the shoulder. A second actuator disposed in the chamber on an opposing side of the shoulder. The first and second actuators each have an excitable material for pushing against the shoulder to move the steering rod longitudinally within the chamber.

Accordingly, the invention addresses problems of the prior art systems by directly moving the steering rod in a linear motion with the first and second actuators on opposing sides of a shoulder fixed to the steering rod. In addition, the invention does not require components such as a geartrain to convert the rotational motion of an electric motor into a linear movement and can be powered using an electrical source.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a power steering assembly for a vehicle is shown generally at 20.

Referring to FIGS. 1 to 6, the power steering assembly 20 includes a housing 22. The housing 22 further defines an inner surface 24 and the inner surface 24 defines a chamber 26 extending along an axis 28. A steering rod 30 is supported in the chamber 26 and movable longitudinally along the axis 28. A shoulder 32 is fixed to the steering rod 30 and the shoulder 32 has opposing sides 34. A shaft 36 is supported by the housing 22 and is coupled to the steering rod 30 for translating rotational movement of the shaft 36 to the longitudinal movement of the steering rod 30. The shaft 36, as is generally known in the art, is used to integrate a steering wheel 37 for driver interaction into the power steering assembly 20. Also as is known in the art the steering rod 30 further includes a joint on each end to connect to a tie rod for translating linear movement of the steering rod 30 to steerable wheels of a vehicle.

Figure 1:
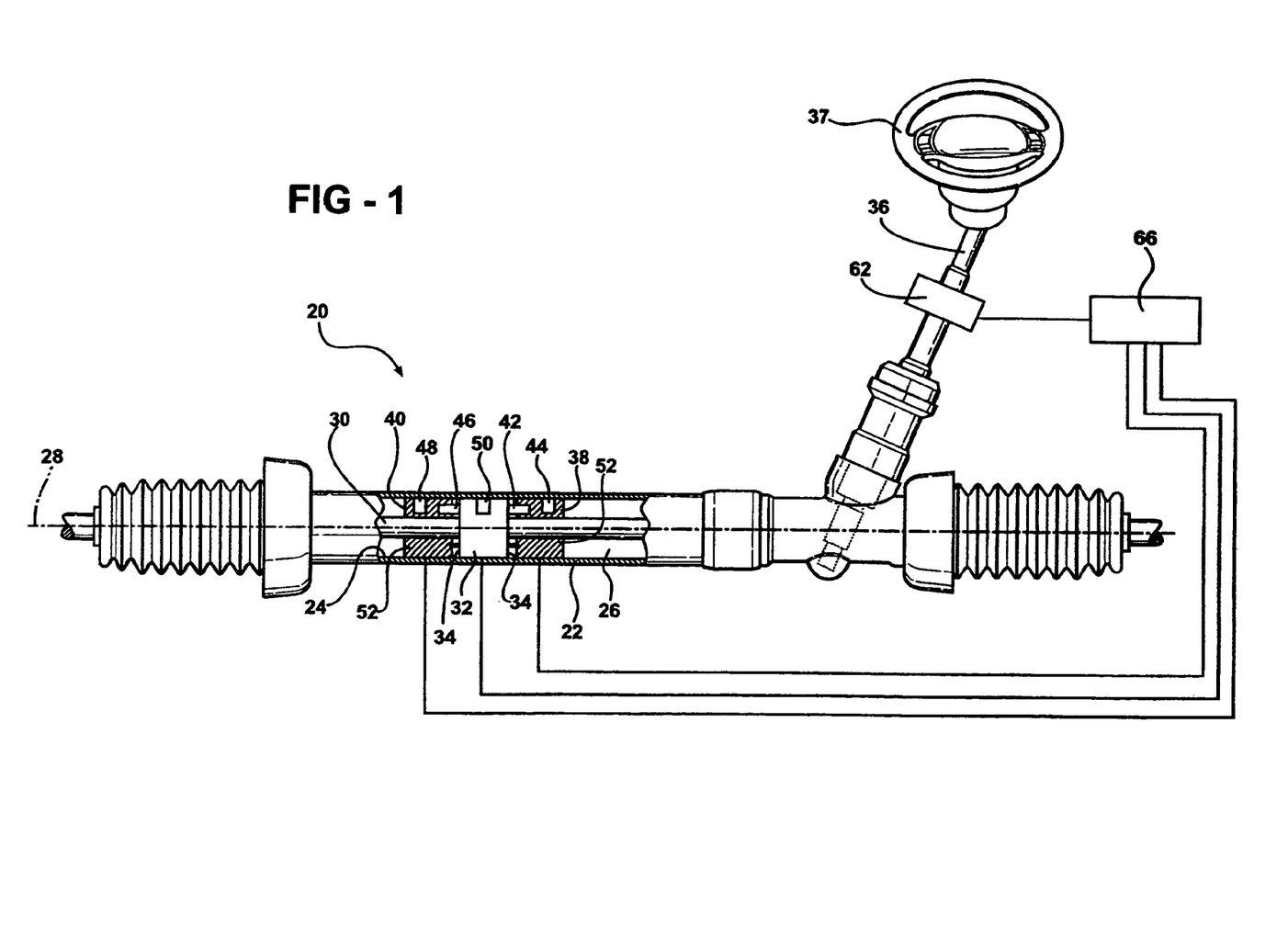
FIG. 1 is a cross-sectional top view of a power steering assembly having a piezoelectric material in each actuator.
Figure 2:
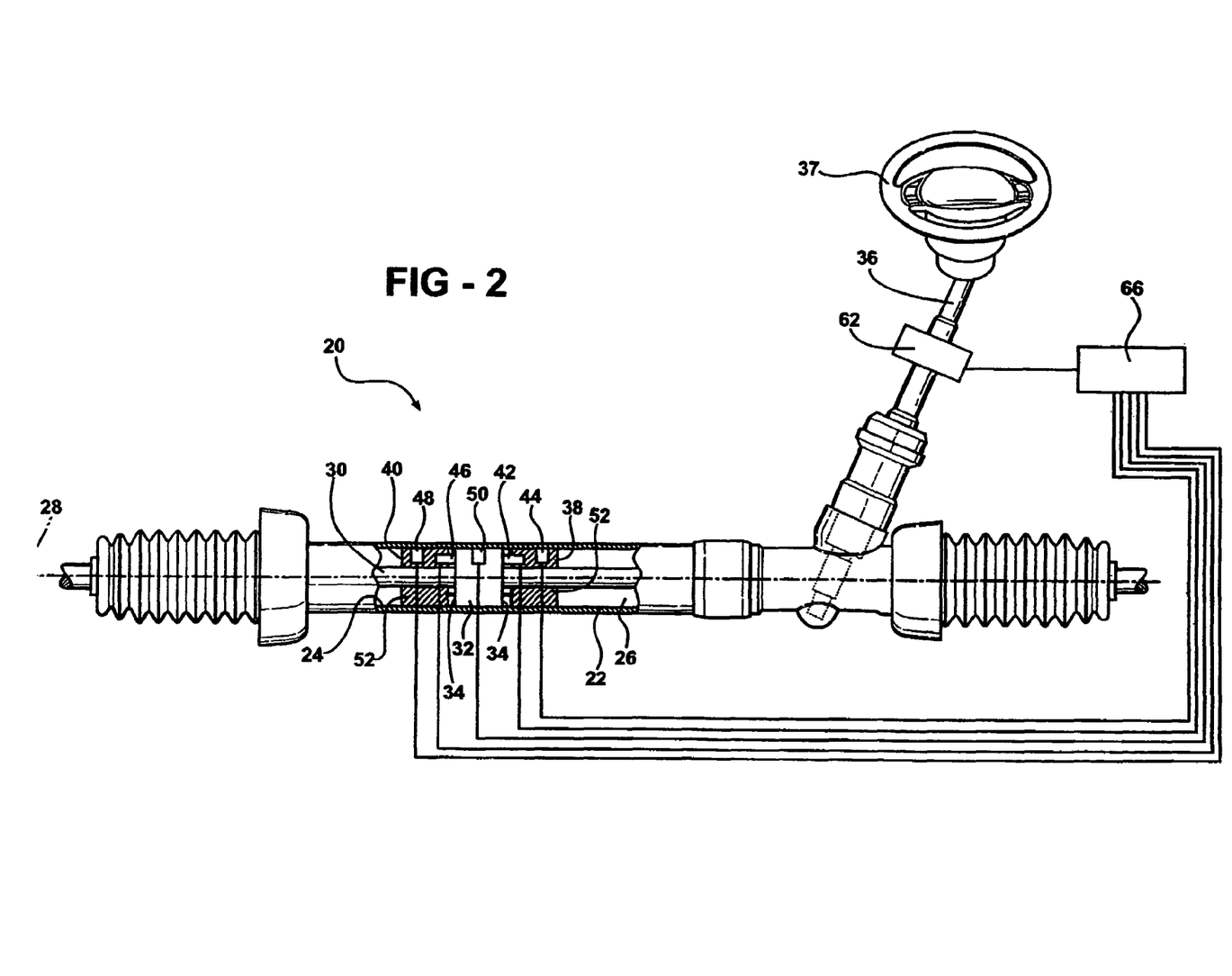
FIG. 2 is a cross-sectional top view of the power steering assembly having a magnetoelastic material in each actuator.

The power steering assembly 20 includes a first actuator 38 disposed on one side 34 of the shoulder 32 and a second actuator 40 disposed on the opposing side 34 of the shoulder 32. Each of the first and second actuators 38, 40 include an excitable material for pushing against the shoulder 32 to move the steering rod 30 longitudinally within the chamber 26. The excitable material can be of a material that is known to extend under the exposure to an electric current, such as a piezoelectric material, as shown in FIG. 1. In addition, the excitable material could be of a material that is known to extend with the change of a magnetic field such as a magnetoelastic material, as shown in FIG. 2. The excitable material provides a force component parallel to the axis 28 for pushing against the shoulder 32 and also a force component that is perpendicular to the axis 28 for securing the first and second actuators 38, 40 in a position in the chamber 26. The parallel and perpendicular forces can be accomplished with one excitable material in each actuator or a plurality of excitable material in each actuator. It is contemplated that with one excitable material in each actuator that the excitable material will be mounted at an angle. The parallel and perpendicular forces provide for a linear travel of the actuators 38, 40 with no conversion of forces, i.e., a geartrain or a hydraulic pump, to assist the movement of the steering rod 30. Since there is no need for a geartrain this further removes the backlash as seen in the prior art electric power steering systems. In addition, any issues relating to the inertia of the prior art electric power steering systems is overcome with the subject invention.

In the embodiment shown in the FIGS. 1 to 4, each actuator includes a pair of excitable materials 42, 44, 46, 48, 50. The first actuator 38 includes a casing 52 supported by the inner surface 24 of the housing 22. The casing 52 of the first actuator 38 supports a first excitable material 42 and a second excitable material 44. The first excitable material 42 exerts a force generally parallel with the axis 28 and against the shoulder 32 when extended for moving the steering rod 30 longitudinally relative to the housing 22. The second excitable material 44 exerts a force generally perpendicular to the axis 28 when extended for holding the first actuator 38 in a position within the chamber 26. The second actuator 40 is a mirror arrangement of the first actuator 38 on the opposing side 34 of the shoulder 32. The second actuator 40 similarly includes a casing 52 supported by the inner surface 24 of the housing 22. The casing 52 of the second actuator 40 supports a third excitable material 46 and a fourth excitable material 48. The third excitable material 46 exerts a force generally parallel with the axis 28 against the shoulder 32 when extended for moving the steering rod 30 longitudinally relative to the housing 22. The fourth excitable material 48 exerts a force generally perpendicular to the axis 28 when extended for holding the second actuator 40 in a position within the chamber 26. Optionally, as shown in FIG. 3a, the inner surface 24 can define a plurality of teeth 54 adjacent the second and fourth excitable materials 44, 48. The second and fourth excitable material 44, 48 selectively engage the plurality of teeth 54 for additional holding capability of the first and second actuator 38, 40 in a position in the chamber 26.

The shoulder 32 includes a shoulder excitable material 50 for engaging the inner surface 24 of the housing 22 to secure the shoulder 32 in a hold position within the chamber 26. In addition, the shoulder excitable material 50 could further selectively engage the teeth 54 of the inner surface 24. The shoulder 32 as shown in the FIGS. 1 to 4, defines a passage 56 that will for allowing the interconnection of the first and second actuator 38, 40 through the shoulder 32 and will be fully discussed below.

As shown in FIGS. 1 to 4, a biasing member 58 biases the first and second actuators 38, 40 into contact with the sides 34 of the shoulder 32. The biasing member 58 can include various arrangements as is known to one skilled in the art. In the preferred embodiment, the biasing member 58 extends through the passage 56 in the shoulder 32 to interconnect the first and second actuators 38, 40. The biasing member 58, as shown in FIGS. 1 to 4, is a coiled spring. It would be contemplated that more than one biasing member 58 could be used to bias each of the first and second actuators 38, 40 into contact with the sides 34 of the shoulder 32. In such a design, a biasing member 58 would interconnect each of the actuators 38, 40 to the sides 34 of the shoulder 32. It would also be contemplated to eliminate the passage 56 through the shoulder 32.

The power steering assembly 20 further includes a controller 60 for controlling an extension and retraction of the excitable materials 42, 44, 46, 48, 50. The controller 60 will send a signal to energize for extension or de-energize for retraction to the excitable materials 42, 44, 46, 48, 50. The energizing signal depends on the material of the excitable materials 42, 44, 46, 48, 50 such as a voltage or creates a magnetic field.

Referring to the first embodiment FIG. 1, the excitable materials 42, 44, 46, 48, 50 are piezoelectric material. The controller 60 in this embodiment controls the extension and retraction excitable materials 42, 44, 46, 48, 50 by selectively sending an electric current to each of the excitable materials 42, 44, 46, 48, 50. The connection between each of the excitable material 42, 44, 46, 48, 50 and the controller 60 may be accomplished in any suitable manner known in the art so long as the actuators 38, 40 can move along the axis 28. The specific design of such a connection would depend on the durability and demands on the power steering assembly 20. Examples of the connections include a rail design or a flexible ribbon in engagement with each of the actuators 38, 40 and the shoulder 32. As one skilled in the art recognizes there are a variety of means to accomplish the connection between the controller 60 and the excitable materials 42, 44, 46, 48, 50.

Figure 2A:
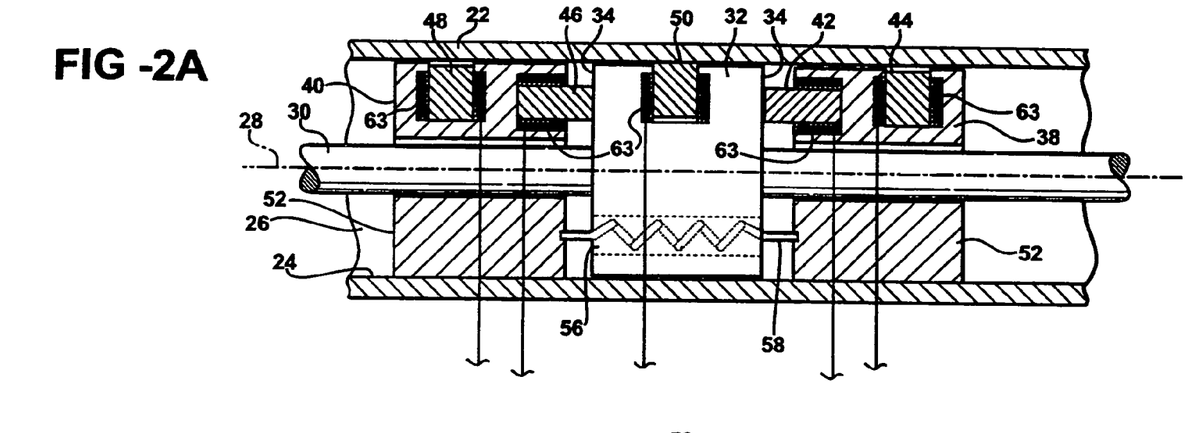
FIG. 2a is an detailed view of an actuator having the magnetoelastic material.

Referring to the second embodiment in FIGS. 2 and 2a, the excitable materials 42, 44, 46, 48, 50 are magnetoelastic material. The controller 60 controls the excitable material 42, 44, 46, 48, 50 by selectively creating a magnetic field adjacent the excitable materials 42, 44, 46, 48, 50. As shown in FIG. 2a, one contemplated design to create the magnetic field is by a coil 63 embedded in the casing 52 of the actuators 38, 40 and in the shoulder 32 around the excitable material 42, 44, 46, 48, 50. The casing 52 and shoulder 32 or the housing 22 would preferably be shielded to avoid inadvertent activation of the excitable material 42, 44, 46, 48, 50 out of sequence by outside magnetic fields. The outside magnetic fields can include magnetic fields created within the engine compartment of a vehicle, such as by the alternator or engine, and the operating environment. As with the embodiment of FIG. 1, the connection between the controller 60 and the coils 63 may be accomplished in any suitable manner known in the art so long as the actuators can move along the axis. The specific design of the connection would depend on the durability and demands on the power steering assembly 20. Examples of the connections include a rail design or a flexible ribbon in engagement with each of the actuators 38, 40 and shoulder 32. As one skilled in the art recognizes there are a variety of means to accomplish the connection between the controller 60 and the coils 63 to control the extension and retraction of the excitable materials 42, 44, 46, 48, 50.

The controller 60 controls the extension and retraction of the excitable materials 42, 44, 46, 48, 50 based on input received from a sensor 62. The sensor 62 is connected to the shaft 36 and detects the rotation of the shaft 36. The controller 60 determines a direction and a degree of rotation of the shaft 36 and then determines the necessary speed or frequency of the extension and retraction of the excitable materials 42, 44, 46, 48, 50 to assist with the turning of the steerable wheels of the vehicle.

As discussed above, the excitable materials 42, 44, 46, 48, 50 can be any suitable material, such as piezoelectric or magnetoelastic. Each of these excitable materials 42, 44, 46, 48, 50 extends with a high force to the degree of 15 kN, however, the stroke or length of the extension is short, approximately 0.15% of the length of the excitable material. Therefore the controller 60 activates the excitable materials 42, 44, 46, 48, 50 in a rapid series to provide a crawling or linear step movement. The frequency of the activation of the series is high enough such that to a driver the movement of the actuators 38, 40 would feel continuous and smooth. To address the high loads needed in the power steering assembly 20, the invention further utilizes the biasing member 58, such as the coiled spring, to bias and move the actuators 38, 40 into contact with the shoulder 32 throughout the cycling of the series by the controller 60.

For simplification, FIGS. 1 to 4 illustrate one step of the series in a single direction. In addition, it is contemplated that mirroring the series of the extension and the retraction of the excitable materials 42, 44, 46, 48, 50 would advance the actuators 38, 40 in a step in the opposing direction.

Figure 3:
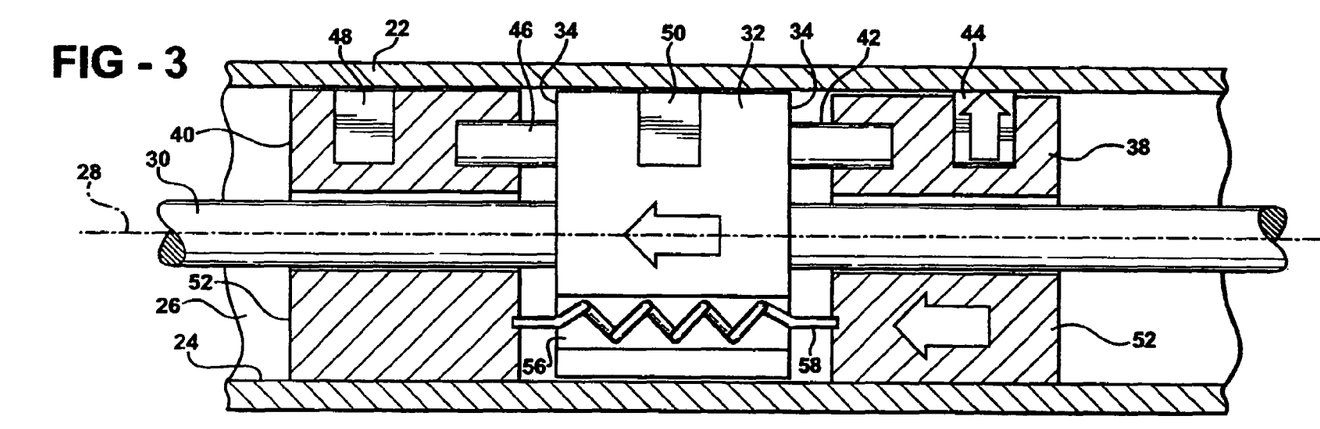
FIG. 3 is a schematic side view of the power steering assembly in a first stage for pushing a steering rod longitudinally relative to a housing.
Figure 3A:
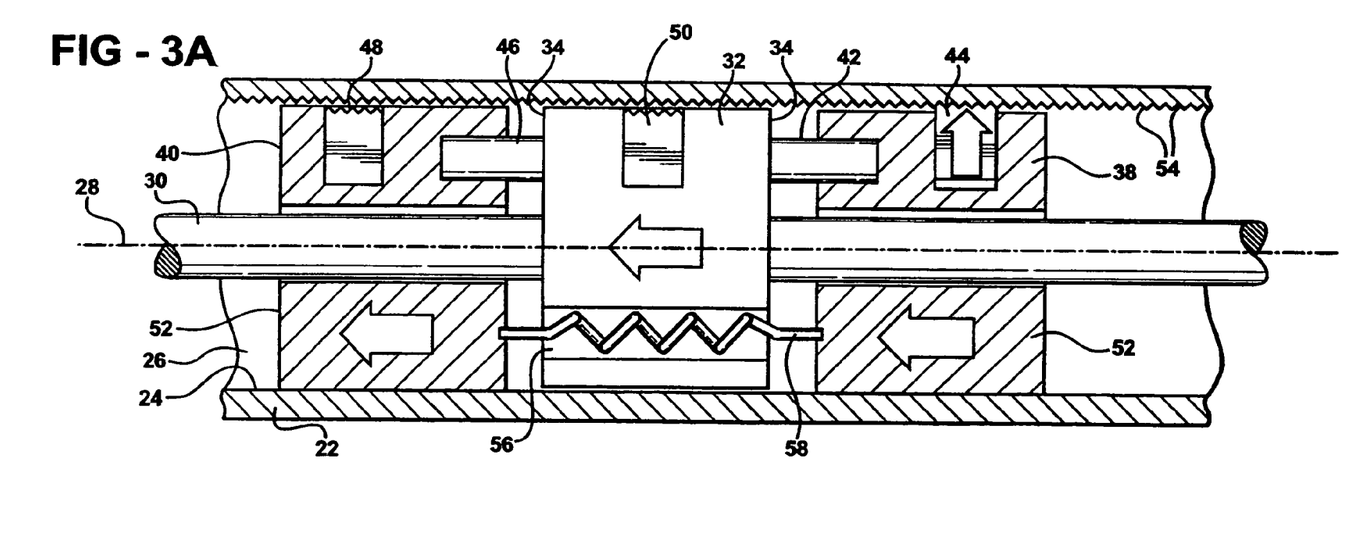
FIG. 3a is an alternative schematic side view of a power steering assembly in a first stage for pushing the steering rod longitudinally relative to the housing.

As shown in FIG. 3, the first actuator 38 is first held into a position within the chamber 26, by the controller 60 energizing the second excitable material 44 into extension. The second excitable material 44 extends engaging with the inner surface 24 of the housing 22 to hold the first actuator 38 in a position in the chamber 26.

Figure 4:
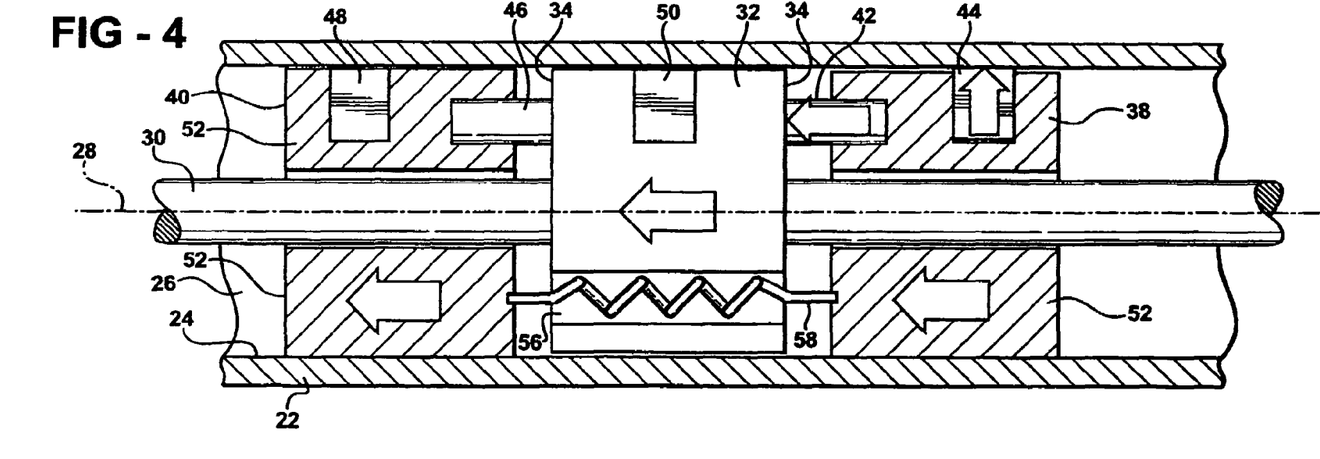
FIG. 4 is a schematic side view of the power steering assembly in a second stage for pushing the steering rod longitudinally relative to the housing.

Referring to FIG. 4, the first actuator 38 continues to be held in position in the chamber 26 by the extension of the second excitable material 44. The controller 60 then energizes the first excitable material 42 into extension. The first excitable material 42 extends pushing against the one side 34 of the shoulder 32 thereby moving the steering rod 30 longitudinally in the chamber 26. The force of the second excitable material 44 perpendicular to the axis 28 must be able to hold the first actuator 38 in position as the first excitable material 42 extends to push the shoulder 32 of the steering rod 30. As shown in FIG. 3a, the inner surface 24 optionally includes the teeth 54 to improve the holding capability of the first actuator 38 in the chamber 26.

Figure 5:
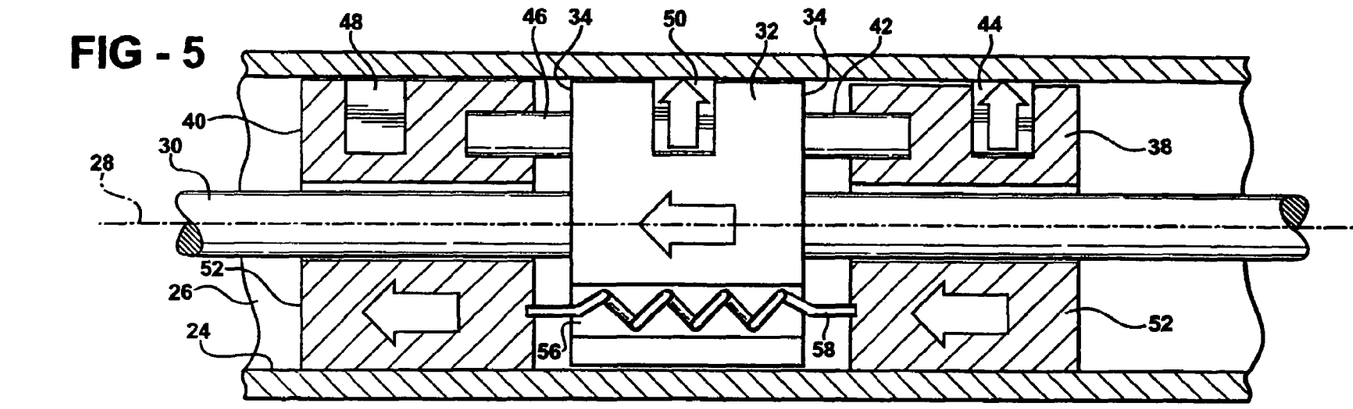
FIG. 5 is a schematic side view of the power steering assembly in a third step for pushing the steering rod longitudinally relative to the housing.

Now referring to FIG. 5, the first and second excitable materials 42, 44 continue to be energized and in extension to hold the shoulder 32 in the pushed distance away from the first actuator 38. The controller 60 energizes the shoulder excitable material 50 into extension to secure the shoulder 32 within the chamber 26 in the hold position.

Figure 6:
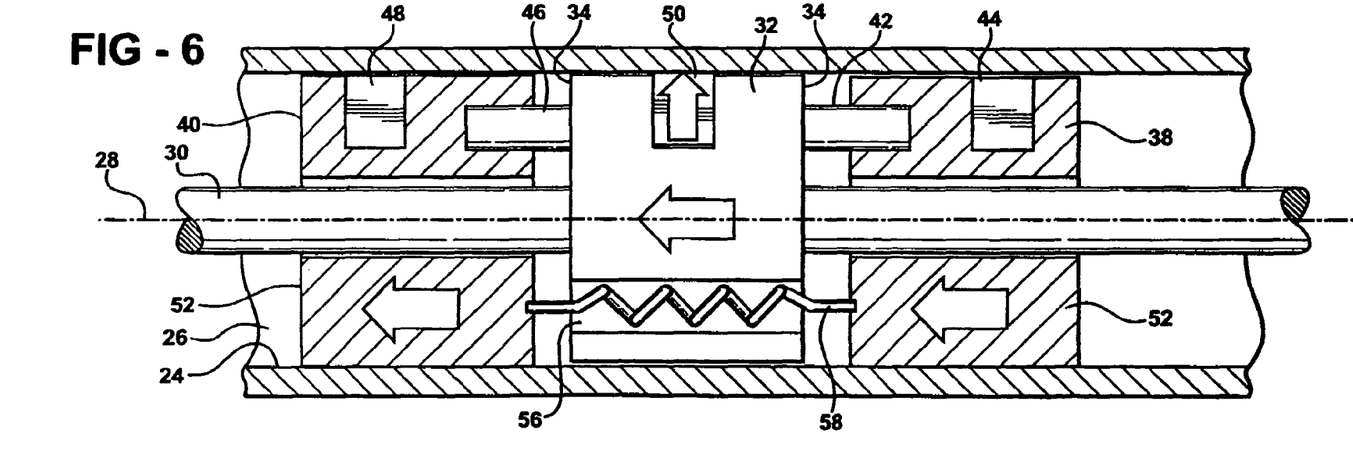
FIG. 6 is a schematic side view of the power steering assembly in a fourth step for pushing the steering rod longitudinally relative to the housing.

Next as shown in FIG. 6, the shoulder excitable material 50 is continued to be energized, and the controller 60 de-energizes the first and second excitable materials 42, 44 to retract. As the second excitable material 44 retracts and disengages the inner surface 24 of the housing 22 the first actuator 38 is release to move within the chamber 26. The biasing member 58 then pulls the first actuator 38 into contact with the shoulder 32. This above series creates one advance of the shoulder 32 to the left, with an incremental push from the first excitable material 42 to move of the shoulder 32 and thereby the steering rod 30. The above series is rapidly continued as previously discussed to accomplish the crawling, linear movement of the actuators 38, 40. The frequency and the series can be mirrored to begin with the holding of the second actuator 40 by the fourth excitable material 48 to accomplish a movement in the opposite direction.

There are additional possible series contemplated for advancing the actuators 38, 40 in a linear movement in the chamber 26. For example, the first actuator 38 is held into position by the controller 60 energizing the second excitable material 44 to extend and engage the inner surface 24 of the housing 22. Next, the controller 60 energizes the first excitable material 42 into extension and the first excitable material 42 continues to extend pushing against the shoulder 32. The fourth excitable material 48 of the second actuator 40 is then energized by the controller 60. The fourth excitable material 48 extends engaging the housing 22 locking the second actuator 40 in position within the chamber 26. The first and second excitable materials 42, 44 are then de-energized by the controller 60 and retracted. As the second excitable material 44 is retracted the first actuator 38 is free to move within the chamber 26. The biasing member 58 pulls the first actuator 38 into contact with the side 34 of the shoulder 32.

An additional series allows for an increased step distance of the actuators 38, 40 along the chamber 26. First, the first actuator 38 is held in position by energizing the second excitable material 44 to extend and engage against the inner surface 24 of the housing 22. The first excitable material 42 then is energized by the controller 60 and extends into engagement with the shoulder 32 and continues to extend pushing the shoulder 32 a distance relative to the housing 22. The first and second excitable materials 42, 44 remain energized in extension as the third excitable material 46 is energized by the controller 60 and extends against the opposing side 34 of the shoulder 32 advancing the second actuator 40 a distance away from the opposing side 34 of the shoulder 32. Next, the controller 60 energizes the fourth excitable material 48 to extend and engage the inner surface 24 of the housing 22, holding the second actuator 40 in position in the chamber 26. Then simultaneously the controller 60 de-energizes the first, second and third excitable materials 42, 44, 46. The biasing member 58 interconnected between the first and second actuator 38, 40 biases the first actuator 38 into contact with the side 34 of the shoulder 32. The biasing member 58 continues biasing the first actuator 38 and pulling both the first actuator 38 and the shoulder 32 until the opposing side 34 of the shoulder 32 is in contact with the second actuator 40. The advantage of this is that the length of the step increased due to the extension of both the first and third excitable materials 42, 46. One skilled in the art could contemplate additional series and additional configurations of the excitable material that would allow for the actuators 38, 40 to push the shoulder 32 assisting the movement of the steering rod 30 longitudinally within the chamber 26.

A Obviously, many modifications and variations of the present invention are possible in light of the above teachings. The invention may be practiced otherwise than as specifically described within the scope of the appended claims.

What is claimed is:

1. A power steering assembly for a vehicle comprising:
   a housing having an inner surface defining a chamber extending along an axis;
   a steering rod disposed in said chamber and movable longitudinally along said axis;
   a shoulder fixed to said steering rod with said shoulder having opposing sides;
   a shaft supported by said housing and coupled to said steering rod for translating rotational movement of said shaft to said longitudinal movement of said steering rod; and
   a first actuator disposed in said chamber on one of said sides of said shoulder and a second actuator disposed in said chamber on an opposing side of said shoulder with each actuator having an excitable material for pushing against said shoulder to move said steering rod longitudinally within said chamber.

2. An assembly as set forth in claim 1 further including at least one biasing member connected to said first and second actuators for biasing said first and second actuators into contact with said sides of said shoulder.

3. An assembly as set forth in claim 2 wherein said shoulder further defines a passage with said biasing member extending through said passage for interconnecting said first actuator and said second actuator.

4. An assembly as set forth in claim 1 wherein said excitable material is further defined as a piezoelectric material.

5. An assembly as set forth in claim 4 further including a controller for sending a voltage to said piezoelectric material to control an extension and retraction of said piezoelectric material.

6. An assembly as set forth in claim 5 further including a sensor connected to said shaft with said sensor in communication with said controller for detecting rotational movement of said shaft and for sending said voltage to said piezoelectric material thereby extending and retracting said piezoelectric material.

7. An assembly as set forth in claim 1 wherein said excitable material is further defined as a magnetoelastic material.

8. An assembly as set forth in claim 7 further including a controller for creating a magnetic field adjacent said magnetoelastic material to control an extension and retraction of said magnetoelastic material.

9. An assembly as set forth in claim 8 further including a sensor connected to said shaft with said sensor in communication with said controller for detecting rotational movement of said shaft and for creating said magnetic field adjacent said magnetoelastic material thereby extending and retracting said magnetoelastic material.

10. An assembly as set forth in claim 1 wherein said first actuator further includes a first excitable material and a second excitable material with said first excitable material exerting a force generally parallel with said axis against said shoulder for pushing said steering rod and said second excitable material exerting a force generally perpendicular to said axis for holding said first actuator in a position within said chamber.

11. An assembly as set forth in claim 10 wherein said second actuator further includes a third excitable material and a fourth excitable material with said third excitable material exerting a force generally parallel with said axis against said shoulder for pushing said steering rod and said fourth excitable material exerting a force generally perpendicular to said axis for holding said second actuator in a position within said chamber.

12. An assembly as set forth in claim 11 wherein said inner surface further defines a plurality of teeth adjacent said second and fourth excitable materials with said second and fourth excitable material selectively engaging said plurality of teeth.

13. An assembly as set forth in claim 12 wherein said shoulder further includes a shoulder excitable material for engaging said inner surface of said housing for securing said shoulder in a hold position within said chamber.

14. An assembly as set forth in claim 1 further including a controller for controlling an extension and retraction of said excitable material.

15. An assembly as set forth in claim 1 wherein said first and second actuators each further include a casing supported in said chamber on said inner surface and movably disposed about said steering rod with said casing supporting said excitable material.

16. A method of actuating a power steering assembly in a vehicle having a housing and a steering rod with a shoulder and an actuator disposed on one side of the shoulder with the actuator having first and second excitable materials, said method comprising the steps of:
  energizing the second excitable material;
  extending the second excitable material due to the energizing of the second excitable material until the second excitable material engages the housing to axially hold the actuator in position;
  energizing the first excitable material;
  extending the first excitable material due to the energizing of the first excitable material until the first excitable material engages the shoulder; and
  continuing to extend the first excitable material to push the shoulder and steering rod axially relative to the housing.

17. A method as set forth in claim 16 further including a shoulder excitable material on the shoulder and further including the step of energizing the shoulder excitable material and extending the shoulder excitable material due to the energizing of the shoulder excitable material until the shoulder excitable material engages the housing to axially hold the shoulder in position.

18. A method as set forth in claim 17 further including the steps of de-energizing the second excitable material and retracting the second excitable material until the second excitable material disengages the housing to release the actuator.

19. A method as set forth in claim 18 further including the steps of de-energizing the first excitable material and retracting the first excitable material.

20. A method as set forth in claim 19 further including the step of moving the actuator about the steering rod relative to the housing toward the shoulder.

* * * * *